United States Patent [19]

Viaud et al.

[11] Patent Number: 5,025,717

[45] Date of Patent: Jun. 25, 1991

[54] MACHINE FOR FORMING CYLINDRICAL BALES OF CROP

[75] Inventors: Jean Viaud, Sarrequemines; Arsène Roth, Walschbronn, both of France; Henry D. Anstey, Ottumwa, Iowa

[73] Assignee: Deere & Company, Moline, Ill.

[21] Appl. No.: 524,537

[22] Filed: May 17, 1990

[30] Foreign Application Priority Data

Jun. 8, 1989 [GB] United Kingdom ............... 8913246

[51] Int. Cl.$^5$ .................... B30B 5/06; A01D 39/00
[52] U.S. Cl. ........................................ 100/88; 56/341
[58] Field of Search ................. 100/5, 87, 88, 89; 56/341-343

[56] References Cited

U.S. PATENT DOCUMENTS

| 4,257,219 | 3/1981 | Burrough et al. | 56/341 |
| 4,391,187 | 7/1983 | Koning et al. | |
| 4,433,619 | 2/1984 | Anstey et al. | 100/88 X |
| 4,545,298 | 10/1985 | Viaud | 100/88 |

FOREIGN PATENT DOCUMENTS

| 2712878 | 9/1978 | Fed. Rep. of Germany | 100/88 |
| 934990 | 6/1982 | U.S.S.R. | 56/341 |

Primary Examiner—Harvey C. Hornsby
Assistant Examiner—Stephen F. Gerrity

[57] ABSTRACT

A baling maching includes a variable volume baling chamber with which there is associated a hydraulic tension cylinder containing fluid in its rod end for resisting expansion of the baling chamber. A high pressure relief valve is connected in circuit between the opposite ends of the cylinder for permitting fluid transfer between the ends in accordance with the pressure setting of the valve. A low pressure relief valve is connected in circuit between the opposite ends of the tension cylinder so as to be in parallel with the high pressure relief valve. A mode select valve is located in circuit between the tension cylinder and the low pressure relief valve and is shiftable between a dense bale position wherein it prevents flow from the rod end of the tension cylinder to the low pressure relief valve whereby fluid exchange between the opposite ends of the tension cylinder is by way of the high pressure relief valve, and a soft bale position wherein it allows fluid to flow freely from the rod end of the tension cylinder to the low pressure relief valve whereby fluid exchange between the opposite ends of the tension cylinder is by way of the low pressure relief valve.

10 Claims, 2 Drawing Sheets

MACHINE FOR FORMING CYLINDRICAL BALES OF CROP

BACKGROUND OF THE INVENTION

This invention relates to a machine for forming cylindrical bales of crop and more particularly relates to such a machine for making bales which are of low density or "soft".

Machines, towed by a tractor, for forming large cylindrical bales of hay (so-called "round balers") are well known. As the machine advances, the crop is removed from a windrow by a pick-up mechanism and delivered rearwardly to a baling chamber where it is rolled round upon itself into a bale.

In one form of such a machine, the baling chamber is defined by runs of belts which move outwardly to enlarge the chamber so as to accommodate the bale as it grows in size. The belts are trained over rolls connected to a drive. A pair of rolls is located at the top of the chamber and these rolls are carried by a swingable tension arm on either side of the machine enabling the two rolls to swing upwardly as the girth of the bale increases. The tension arms are connected to hydraulic piston and cylinder units, i.e., tension cylinders, which resist their upward movement sufficiently to ensure that a dense bale is formed. Hydraulic piston and cylinder units are used to raise a rear gate of the machine to release a completed bale and these units, i.e., gate cylinders, are connected to the tension cylinders.

In most circumstances, a uniformly dense bale is highly desirable. However, in some conditions, it is useful for the core (or indeed the entire bale) to be of low density or soft. Such conditions occur, for example, when the crop has to be baled wet, and hot air is subsequently blown through the completed bale to reduce the excess moisture. This treatment is obviously more effective with a looser bale. Certain special applications also make a softer bale more desirable, e.g., a machine for grinding straw prior to its use in mushroom growing beds will more readily accept this type of bale.

The hydraulic circuitry involving the tension cylinders which brake the tension arms as referred to above includes first and second supply/return lines from quick couplers, connected to the hydraulic supply of the tractor towing the baler, to the rod ends and piston ends respectively of the cylinders. Pressure in the rod ends resists extension of the cylinders and therefore affords the braking effect on the tension arms. Thus, control of this pressure provides control of the density of the bale.

In the known Model 550 Round Baler, produced and marketed by Deere and Company, the pressure is controlled as follows. A check valve is disposed in the first supply/return line running from one of the couplers to the rod ends, and allows flow in the direction of the rod ends. The rod and piston ends are connected by a bypass line interconnecting the first and second supply/return lines which respectively run to the rod and piston ends, with the bypass line being connected to the first supply/return line at a point downstream of the check valve. Located in the bypass line is an adjustable bale density relief valve. The setting for the opening of this latter valve, typically at 180 bars, determines the pressure at which the rod ends are relieved and hence the density of the bale being formed. U.S. Pat. No. 4,391,187 granted to Koning et al. on 5 July 1983 discloses and describes a tensioning system substantially similar to that embodied in the Model 550 Round Baler.

It is desirable to be able to minimize the pressure in the rod ends to produce softer bales (or cores) when needed, and yet maintain the capability of the machine to make dense bales.

SUMMARY OF THE INVENTION

According to the present invention, a machine for forming cylindrical bales of crop of the type having an expansible baling chamber to which a tension cylinder is connected for resisting expansion of the chamber and of the type having a gate swingable between closed and open position by a gate cylinder is provided with and improved hydraulic system for controlling the operation of the tension and gate cylinders.

A broad object of the invention is to provide a hydraulic system for the above-noted type of baling machine for selectively establishing a condition for forming dense bales and a condition for forming soft bales (or cores).

A more specific object of the invention is to provide a hydraulic system including first and second supply/return lines respectively coupled to the rod ends of the gate and tension cylinders and to the piston ends of the gate and tension cylinders, with a mode control valve, a high pressure relief valve and a low pressure relief valve all being so located relative to each other that when the mode valve is in its normal dense bale position, flow between the opposite ends of the tension cylinder is permitted only by a path through said high pressure relief valve and that when the mode valve is in its soft bale position, flow between the opposite ends of the tension cylinder is permitted only by a path through said low pressure relief valve.

These and other objects of the invention will become apparent from a reading of the ensuing description together with the appended drawings.

DESCRIPTION OF THE PREFERRED EMBODIMENT

Unless otherwise noted, "right" and "left" as used in the description below are considered from the view point of a person standing behind the machine and facing in the direction of forward travel.

Figure 1:
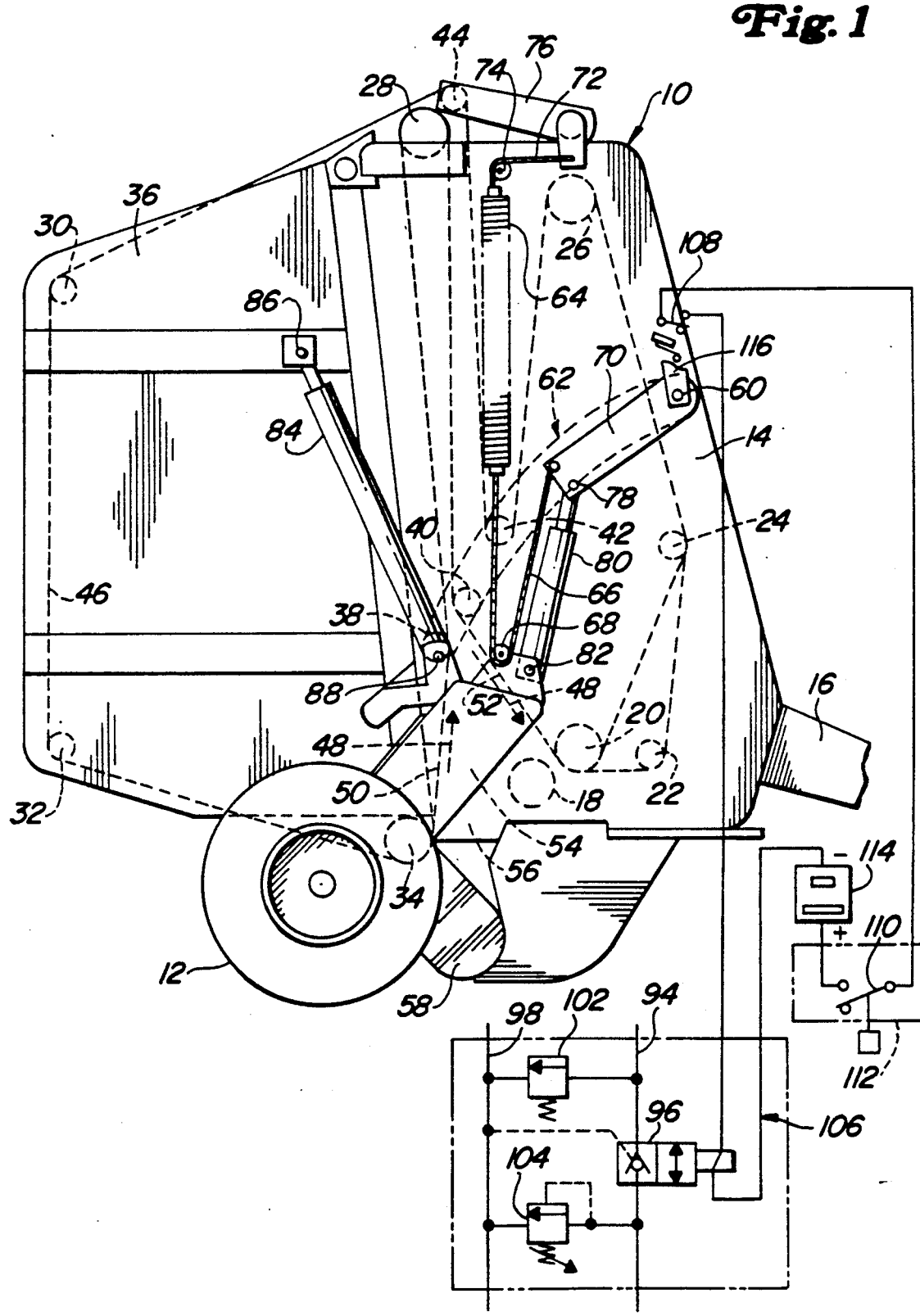
FIG. 1 is a right side elevational view of a machine for forming large cylindrical bales showing certain details only, and an electrical circuit superimposed thereon.

In FIG. 1, the baler includes a main frame 10 mounted on a pair of wheels 12. The main frame has an upright fore-and-aft extending wall 14 on either side connected by transverse beams (not shown). A draft tongue 16 is connected to a transverse beam at the front of the frame 10 and extends forwardly for attaching the baler to a tractor (also not shown) which draws the machine.

A plurality of lateral rolls extend over the width of the machine. One set of rolls 18, 20, 22, 24, 26, 28 is journalled in the side walls 14, while another set consisting of rolls 30, 32, 34 is journalled in a swingable gate 36. There is also a pair of chamber restricting rolls 38, 40 and two belt take-up rolls 42, 44.

Six rubber belts 46 are trained side-by-side over the rolls, with the exception of the roll 18 which acts as a stripper roll, to provide the configuration shown and they move in the direction indicated by arrows 48, the stripper roll 18 being driven anti-clockwise as viewed in FIG. 1. However, alternate belts only are trained over the lower foremost roll 22, while the remaining belts bypass this roll, to provide a staggered array which is of no significance in relation to the present invention but which is described in U.S. Pat. No. 4,399,746, granted 23 Aug. 1983. Upwardly extending runs 50, 52 of the belts 46 define a bale-forming chamber 54, the ends of which are provided by the side walls 14 and gate 36 and which has an inlet 56 for crop received from a pick-up 58 beneath it.

Figure 2:
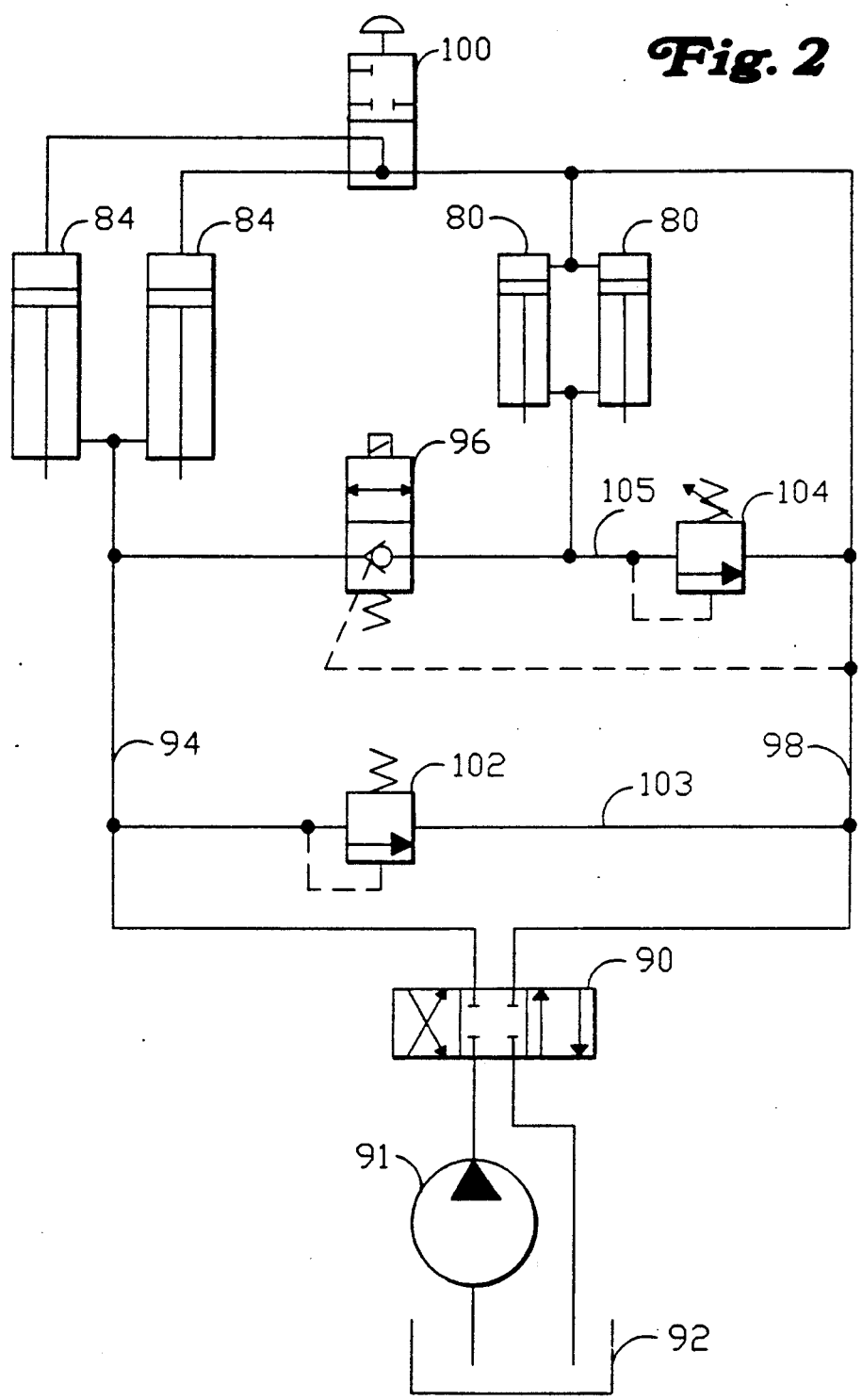
FIG. 2 is a diagram of a hydraulic circuit for the machine in FIG. 1.

In order to accommodate the increasing diameter of a growing bale core in the bale-forming chamber 54, the size of the chamber must also increase and a belt take-up and tensioning mechanism is provided at either side of the machine. These mechanisms include: a pair of rearwardly extending tension arms which are mounted rigidly at the forward end of the main frame 10 on a horizontal transverse shaft 60, providing a pivot connection for the arms, and of which the right hand arm 62 only is shown; the belt take-up roll 42 which is supported at either end at an intermediate location on the arms 62; and the pair of chamber restricting rolls 38, 40 supported at the free ends of the arms. The arms are biased in an anti-clockwise direction (in FIG. 2) by a pair of springs, one on either side of the main frame 10, of which only the right hand spring 64 is shown and only its arrangement will be described, the other being similar. The spring 64 is connected at its lower end by a cable 66 which runs over a pulley 68 to a lever portion 70 of the arm 62, the portion 70 being rigid with the pivot shaft 60, and at its upper end by a cable 72 via a pulley 74 to one arm of a bell crank 76 the other arm of which bears one end of the take-up roll 44. The free end of the lever portion 70 is pivotally connected at a point 78 to the piston rod of a piston and cylinder unit 80, loading the arm 62, of which the cylinder is in turn pivotally connected to the frame 10 at a point 82, a similar arrangement being provided also on the left hand side of the machine.

A further piston and cylinder unit 84 (on either side of the machine) is connected between pivot points 86, 88 on the gate 36 and main frame 10 for opening and closing the gate. For convenience the units 84 will be referred to as gate cylinders 84, and the units 80 as tension cylinders 80.

The arrangement of the relevant hydraulic circuit will now be described. The hydraulic circuit shown in FIG. 2 includes a direction control valve 90, a pump 91 and a sump 92 all of which would normally be found on a towing tractor. A first supply/return line 94 includes a first part which extends directly from the direction control valve 90 to the rod ends of the gate cylinders 84 and includes a second part which extends, through a mode select valve 96, to the rod ends of the tension cylinders 80. The mode select valve 96 is a two position, solenoid operated valve here shown in a normal dense bale position wherein a pilot-operated check valve incorporated therein prevents flow from returning from the rod ends of the tension cylinders 80, the valve 90 shifting, in response to energizing the coil of the solenoid thereof, to an actuated soft bale position wherein it permits free flow to and from rod ends of the tension cylinders 80. A second supply-return line 98 includes a first part which extends directly from the direction control valve 90 to the piston ends of the tension cylinders 80 and a second part which is connected to the piston ends of the gate cylinders 84 by way of a manually operable gate lock valve 100. A low pressure relief valve 102 is located in a bypass line 103 connected between the respective first parts of the supply/return lines 94 and 98. An adjustable high pressure relief valve 104 is connected in a bypass line 105 having one end connected to the supply/return line 94 at a location between the mode select valve 96 and the rod ends of the tension cylinders, and having another end connected to the first part of the supply/return line 98.

Control of the solenoid of the mode select valve 96 is exercised through an electrical circuit 106 which is shown in FIG. 1 and in which: the solenoid (i.e. the solenoid coil) of the valve 96; an automatic bale size switch 108 adjacent the tension arm 62 on the baling machine; and a manual control switch 110 on a monitor box 112 in the driver's cab of the tractor are all disposed in series with an electrical source 114 on the tractor.

Thus, with both the switch 108 and the switch 110 closed, the solenoid of the valve 96 will be actuated to move the valve 96 to its free flow position to thereby establish a soft bale mode of operation, and if either one or both of the switches is (are) open the circuit to the solenoid is broken and the valve 96 will revert to its one-way flow position to thereby establish a dense bale mode of operation.

The switch 108 operates in dependence on the position of the tension arm 62 during its swing. In particular, a short trigger arm 116, which is rigid with the transverse shaft 60 and which therefore swings with the tension arm 62, opens the switch 108 from its "home" closed condition when the tension arm 62 has swung to the necessary predetermined angle. The trigger arm 116 and the switch 108 are relatively adjustable so that this angle can be varied according to the choice of the operator for the core size of the bale. The switch 110 in the monitor box 112 incorporates a signal light which is "on" when circuit 106 is made.

The operation of the hydraulic circuit will now be described.

Assuming that the switch 110 at the operator's cab is open, the solenoid of the mode select valve 96 will be de-energized and the valve will be in its normal dense bale position wherein the one way or check valve thereof establishes a condition for effecting formation of a dense bale by causing the pressure in the rod ends of the tension cylinders 80 to be relieved to the piston ends only by way of the high pressure relief valve 104. The pressure setting of the valve 104 may be set, for example, at 180 bars at which pressure it will permit flow between the rod and piston ends of the tension cylinders 80. In this manner the tension cylinders 80 offer sufficiently high resistance to the upward swinging movement of the tension arms 62 and thus to the expansion of the bale chamber 54 for a dense bale to be formed.

If a soft core bale is desired, then at the start of baling the switch 110 is closed so as to actuate the mode select valve 96 to place it in its actuated soft bale position wherein it establishes a condition wherein flow between the rod and piston ends of the tension cylinders 80 will bypass the relief valve 104 and occur by way of the low pressure relief valve 102 which is set to open at a pressure setting much lower than that of the valve 104, e.g., at only 50 bars. Thus, the tension cylinders will resist movement of the tension arms 62 far less and a soft core will be baled. The low pressure setting of 50 bars for the valve 102 is the value of the pressure difference required between the rod and piston ends of the cylinders 80 in order to be able to retract the rods.

At the chosen size of the core, the tension arm 62 reaches the predetermined angle necessary for the trigger arm 116 to open the bale size switch 108, thus breaking circuit 106 which ceases to actuate the solenoid of the valve 96 causing the valve to revert to its dense bale position. With the valve in this position, control pressure in the rod ends of the tension cylinders 80 is again by way of the high pressure relief valve 104 and the density of the outer bale portion being produced is high.

Should the driver wish to produce a completely soft bale, the circuit 106 must be maintained as made during the entire operation. Therefore, the control switch 110 is closed initially as before, but the relative position between the trigger arm 116 and the bale size switch 108 is adjusted so that the arm cannot open the switch 108 throughout the entire swing of the arm.

We claim:

1. In a machine for forming cylindrical bales of crop having a variable volume baling chamber and a hydraulic system which includes a tension cylinder arranged so that a first end thereof can provide resistance to an increase in said volume and which is connected to a first supply/return line, said tension cylinder having a second end which is connected to a second supply/return line and a high pressure relief valve being connected in a first bypass line interconnecting the first and second supply/return lines, the improvement comprising: a low pressure relief valve being connected in a second bypass line interconnecting said first and second supply/return lines in parallel with said first bypass line; a mode select valve means being connected in the first supply/return line so as to be positioned between the low pressure relief valve and said first end of the tension cylinder; and said mode select valve means being shiftable between a dense bale position, preventing fluid flow from said first end of the tension cylinder to said low pressure relief valve means whereby fluid flows from the first to the second end of the tension cylinder only by way of the high pressure relief valve and a soft bale position, permitting fluid to flow from the first to the second end of the tension cylinder by way of the low pressure relief valve.

2. The machine defined in claim 1 wherein the mode select valve means is a solenoid actuated valve.

3. The machine defined in claim 1 wherein the mode select valve means contains a check valve which is placed in circuit between said one end of the tension cylinder and said low pressure relief valve for preventing fluid flow from said one end towards said low pressure relief valve when the mode select valve means is in its dense bale position.

4. The machine defined in claim 3 wherein said mode select valve means is a solenoid actuated valve and wherein its dense bale position is a normal position which it occupies when the solenoid is de-energized.

5. The machine defined in claim 4 wherein said solenoid is connected to an electrical power source by way of a circuit containing a manually operable switch adapted for being located at an operator's position on a towing tractor.

6. The machine defined in claim 5 wherein a normally closed bale size switch is connected in said circuit in series with said manually operable switch; and said bale size switch being arranged for being opened in response to a bale reaching a predetermined size within the baling chamber.

7. The machine defined in claim 6 wherein the machine has an abutment movable with the chamber as it increases in volume, the abutment being disposed to contact the bale size switch at the said predetermined size to open the switch.

8. The machine defined in claim 7 wherein the bale size switch is adjustably mounted relative to the abutment to vary the said predetermined size of the growing bale at which the abutment opens the switch.

9. The machine defined in claim 8 wherein the position of the abutment relative to the bale size switch can be adjusted to a position in which the abutment does not contact the bale size switch during formation of a bale.

10. The machine defined in claim 1 wherein the hydraulic system includes a gate cylinder for opening and closing a bale discharge gate of the machine, said gate cylinder being connected at one end to said first supply/return line at a location on a side of said mode select valve means which is remote from said tension cylinder, and connected at its other end to said second supply/return line.

* * * * *